Aug. 18, 1970 G. H. LEONARD 3,525,094

SHAFT POSITION ENCODERS

Filed Oct. 11, 1965 4 Sheets-Sheet 2

3,525,094

SHAFT POSITION ENCODERS

George Hamlin Leonard, Riverside, Conn.
(327 Hollow Tree Ridge Road, Darien, Conn. 06820)

Filed Oct. 11, 1965, Ser. No. 494,524
Int. Cl. H04l 3/00; H03k 13/00
U.S. Cl. 340—347 35 Claims

ABSTRACT OF THE DISCLOSURE

Two code wheels each having multiple tracks of code bits are geared together so as to cause the slow one to advance through a one-bit arc during a whole rotation of the fast wheel. For each code-bit track of the slow wheel, the fast wheel has a gating means including a spiral aperture whose ends are mutually offset so as to abruptly shift from exposing for photoelectric sensing one bit of its related track of the slow wheel to exposing the adjacent bit of that track during a one-bit arcuate extent of rotation of the high speed wheel, for generating composite codes including bits from the tracks of both wheels and thereby achieving high accuracy in a shaft position encoder.

The present invention relates to what has commonly been called shaft position encoders. It is necessary at times to convert the positions of movable members other than shafts into position codes; but because the encoder which is coupled to such movable member usually involves one or more shafts coupled to encoding elements, it is ordinary (but not limiting) parlance to use the term "shaft position encoder" when referring to devices of the type here of concern. Another commonly used term for such apparatus is "analog-to-digital" converter, or simply "A-D converter."

An impressive variety of shaft position encoders or A-D converters have been proposed over recent years for providing ever-more precise representations of shaft position. A single encoding disc or an endless band containing a large number of information bits would be desirable as a relatively simple structure. However, an encoder that depends upon a single code-bearing member tends to become either excessively large or excessively exacting as to the small sizes and extreme precision of the code member and its sensing elements. Further, there is a practical limit to the number of binary-code bits that can be represented in an encoder of modest size.

The term "binary" is used here to denote a code in which each significant bit or information part of the code is one of two possible kinds, as for example a light-transmitting aperture or an opaque area. The term "bit" signifies a unit of the information in a multiple-bit or combination code. To illustrate, a rudimentary code member of a form suitable for photoelectric sensing may have a total of 24 bits arranged in eight columns and three rows, certain ones of the bits being light-transmitting apertures and the other bits being represented by opaque areas. In this example, if there are three bits in each code combination, then there are eight code combinations; and there are three "tracks" of bits. The bits of each track move successively into a sensing or display area related to that track of bits. Another term that is used below is an "element" of a track of bits. This term as used here means a bit of one kind (such as an aperture in a photoelectrically sensed code member) where that one bit is preceded and followed into sensing position by bits of the opposite kind (as opaque areas); and the term "track element" also means a succession of bits of the same kind preceded and followed in a track by bits of the opposite kind.

It has been proposed to use multiple code-bearing discs or bands or cylinders geared together so that the resulting code is derived in part from a low-speed element and in part from another element that is operated at a relatively rapid rate to repeat its sequence of code combinations many times in the course of a single traverse through the code sequence of the low-speed encoding element. (Implicitly the encoding element is taken as being movable, and the sensing elements are assumed stationary since this is usually more practical. However, occasionally the reverse of these relative movements is used, where one set or both of the sets of sensing elements move in relation to stationary encoding member or members. Such reversal is, of course, within present contemplation.) Multiple code-bearing members normally involve a high-speed code pattern that completes its code sequence in the course of a single code-combination advance of the low-speed code-bearing member. There is a problem of precision and speed and reliability in effecting a change of the sensed and effective code combination of the low-speed encoding member from one code combination to the next when the high-speed code member is leaving the last code combination of its code sequence and advances to the first code combination in the next following repeat sequence.

An object of the present invention resides in providing a new shaft position encoder or A-D encoder having low- and high-speed code members geared together, in which a novel solution is provided for the foregoing problem.

In achieving this object by means of the illustrative apparatus described below, two geared-together code members are advanced continuously (or with interruptions dictated by the operations required of the coupled apparatus) and the successive code combinations are sensed, each code member contributing its part to each composite code combination. In coordination with the advance of the high-speed member through its sequence, a respective spiral mask is caused to traverse that portion of each track of bits of the low-speed code member which is in sensing position. The portions of the low-speed member traversed by respective spirals advance slowly by a group of sensing elements. The spiral masks move at relatively high-speed and each spiral displays a one-bit area of the corresponding low-speed tracks of bits. There is a step or off-set between the end portions of each spiral. This off-set moves across the sensing or display area during the time that a one-bit extent of the high-speed code member advances across its grouping of sensing elements. At this time, a pair of bits of the corresponding track of the low-speed code members are in position to be sensed. During the time that it takes for the high-speed code member to advance through a one-bit extent past its sensing elements, the spiral mask gates this pair of bits so as to display first one bit and then the second for sensing. The second bit advances slowly and is displayed for sensing by the spiral until a third bit of that track of bits comes into sensing position. The step or off-set portions of the spiral gates the second bit out of sensing condition and gates the third bit into effect. As will be seen a detail of this gating organization involves the manner in which one bit that is momentarily in sensing effect is replaced by a following bit. The change in output from the sensing means in the apparatus described below occurs instantly as the step of the spiral passes at or near the mid-point of the sensing area.

The form of sensing devices used in the illustrative embodiment involves transmission of light from a source at one side of the sensed code member to a light-responsive element or assembly of elements at the opposite side of the code member. In a broader application of the novel concepts, the excitation medium and the corresponding form of sensor used in the sensing process can be varied. For example, electrostatic fields and infra-red radiation can be used in place of visible light in applying novel concepts here involved; and in a similar manner, jets of air under pressure or ionized particles may be used with sensors correspondingly responsive to pressure or velocity or ionization. For many purposes, a wide variety of other physical media and sensing elements can be used for sensing, but light and photodetectors are used to special advantage in the illustrative embodiment.

Where there is a large capability of the encoder to represent many positions, at times there is need to judge the encoder, to determine the part of its range that is in effect at a given time, and to do so without resort to actually sensing the code in effect and without translating the code. An object of the present invention resides in the provision in an encoder, especially of the type having geared-together code members, of a gage that directly indicates the setting of the encoder at certain prominent points in its total range.

Encoders are ordinarily geared to apparatus whose motions are to be represented by position codes. Where this is to be achieved with high accuracy, each position-representing code should be replaced by another code in response to a very slight displacement, and a given position code should repeat when that position of the external apparauts repeats, even where back-and-forth motions are involved. A feature of the invention resides in a novel encoder equipped with a means that is especially effective in such encoders for avoiding error-inducing looseness.

Position encoders have been used where the code is a straightforward binary digital code and the codes advance in numerical sequence along the range of positions represented. As an improvement, "cyclic" codes have been proposed characterized in that a change in the code from any one position to its neighboring differently coded position involves a change at only one bit of the code. Such cyclic codes are used in position encoders even where ordinary binary numerical codes are needed for associated utilizatoin apparatus. Code translators are interposed.

A still further object of the present invention resides in the provision of new and effective coding arrangements for imparting the advantages of cyclic codes to position encoders of the type having high-speed and low-speed code members geared together.

The nature of the invention and its further novel features and advantages will be more fully apparent from the following detailed description of the presently preferred embodiment, this embodiment being shown in the accompanying drawings.

Figures 1, 2:
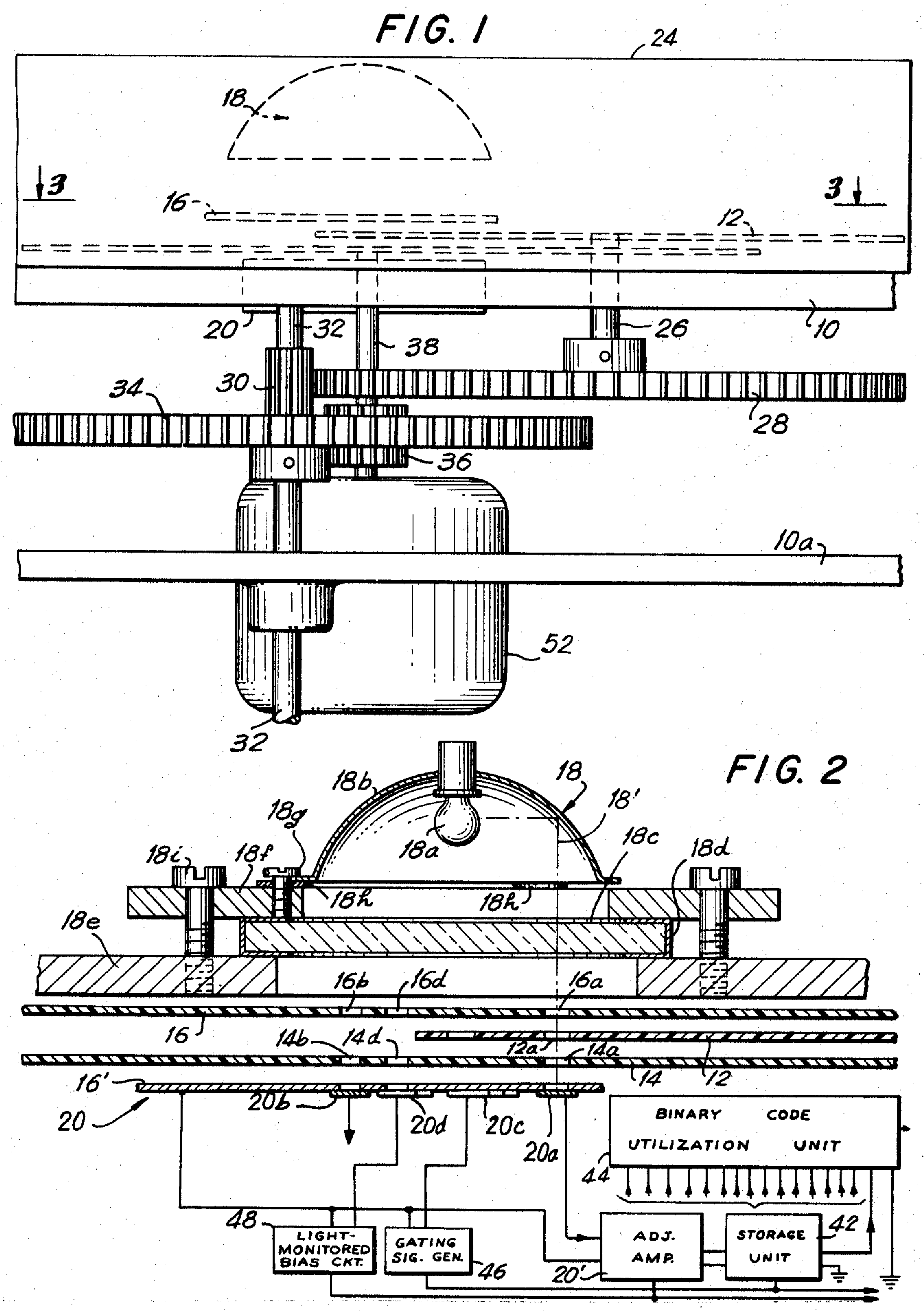
FIG. 1 is a lateral view of a presently preferred embodiment of the invention, parts of the housing being removed to illustrate a gear train.
FIG. 2 is a portion of the apparatus in FIG. 1 shown in cross-section at a plane parallel to the plane of FIG. 1 and drawn to somewhat enlarged scale, this figure further including a block diagram of the electrical output circuit for the photocell assembly 20 in FIG. 1.
Figures 6, 7, 8:
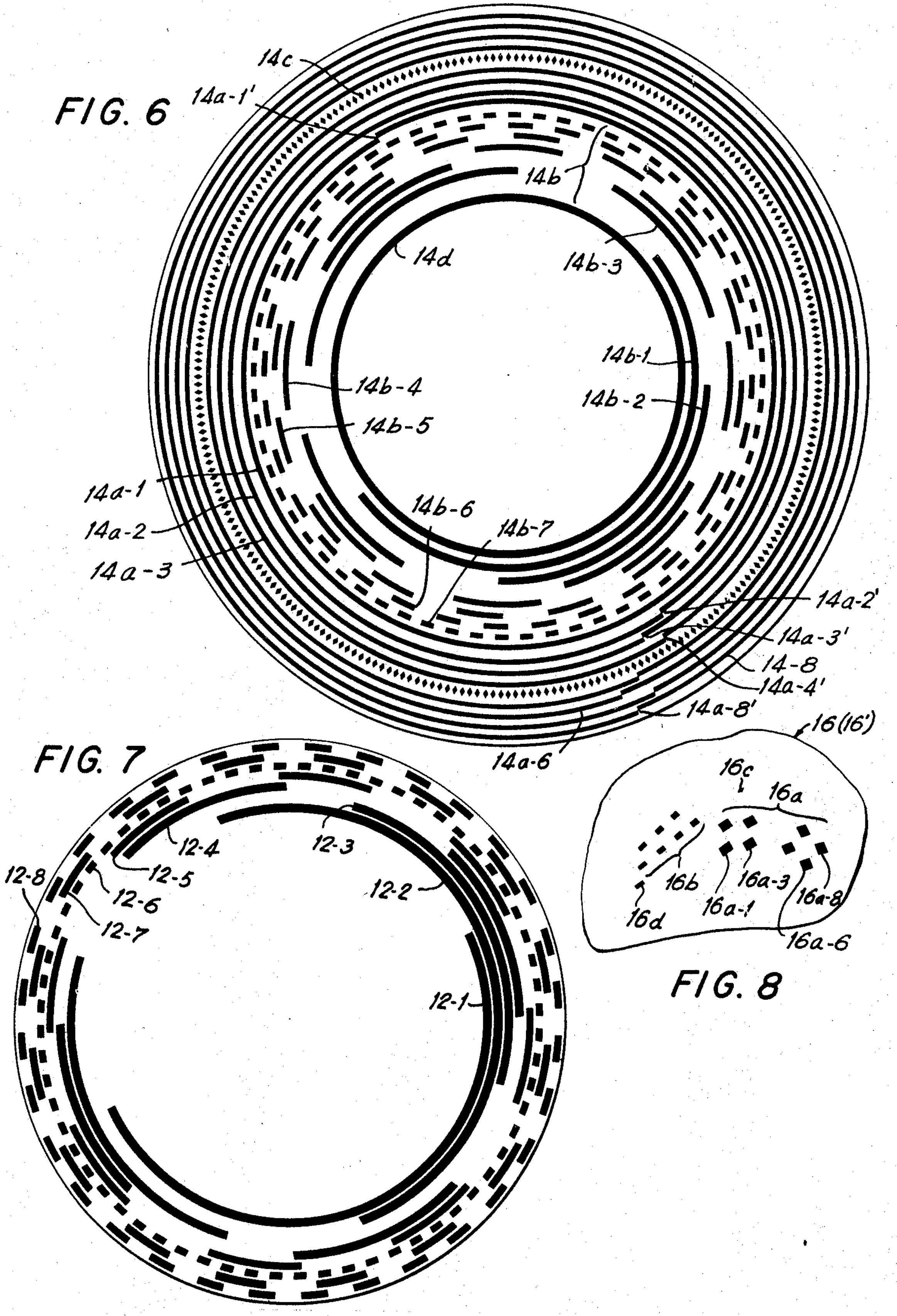
Figure 9:
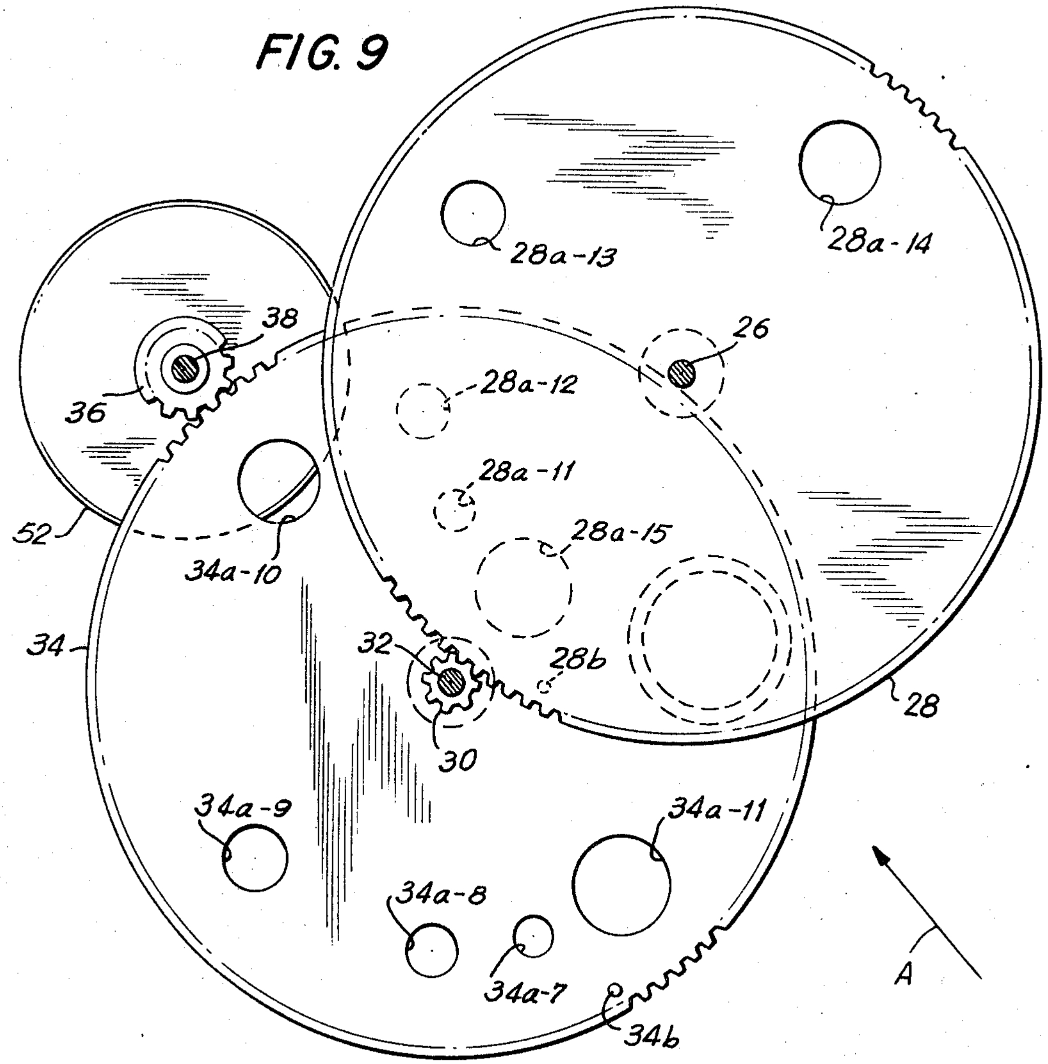
Figure 10:
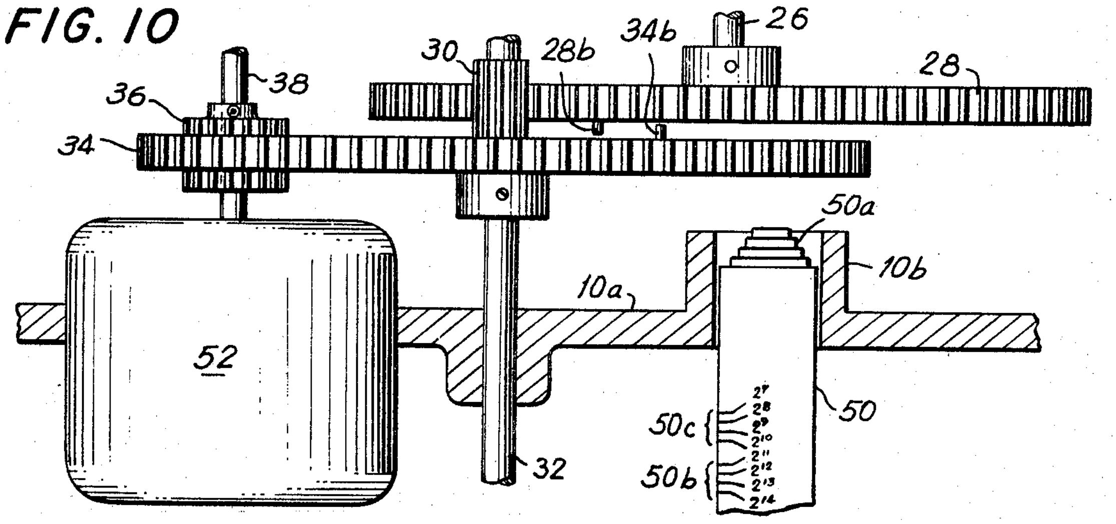

FIGS. 6, 7 and 8 are, respectively, views of code discs 14 and 12 and an aperture mask 16 constituting elements of the apparatus of FIGS. 1–5, the black areas within the outlines of the elements in these figures representing apertures and the remainder being opaque;

FIG. 9 is a fragmentary top plan view of the gearing in FIG. 1 shown in an indexed position on the sheet, the front of FIG. 1 being represented in FIG. 9 by a large arrow A; and FIG. 10 is a fragmentary front elevation of the apparatus in FIG. 9.

Referring now to the drawings, particularly FIG. 1, main bearing plate 10 provides through bearing support for shafts 26 and 38 carrying low-speed code disc 12 and high-speed code disc 14, respectively. An aperture mask 16 overlies part of code disc 14 as well as mutually opposed parts of code discs 12 and 14, and a parallel-beam light source 18 is supported above aperture mask 16. At the side of code discs 12 and 14 opposite to light source 18 and fixed in plate 10, there is an assembly or nest 20 of photocells distributed according to the pattern of apertures in mask 16. A cover 24 encloses the foregoing assembly of parts. Gear 28 is fixed to shaft 26 of low-speed disc 12 and meshes with pinion 30 fixed to shaft 32. The latter shaft is used here to introduce mechanical input into the encoder. Also fixed to shaft 32 is a gear 34 that meshes with pinion 36 on shaft 38 of the high-speed code disc 14.

Lower frame plate **10*a* provides bearing support for input shaft 32, and plate 10*a* also carries a rotary electric motor 40 whose rotor is fixed to shaft 32 for imposing sustained one-way torsion or yielding bias on shaft 32** for a purpose detailed more fully below.

As shown in FIG. 2, light source 18 includes a common incandescent bulb **18*a*, a reflector 18*b* and a heat-absorbing glass filter 18*c*. The latter has a bonded margin-and-edge covering 18*d* as of sprayed-on metal in heat-transferring contact with plate 18*e* and clamping plate 18*f*. Screws 18*g* (only one being shown) and washers 18*h* hold reflector 18*b* and bulb 18*a* in place on clamping plate 18*f* with a vent space separating reflector 18*b* and plate 18*f*. Screws 18*i* secure plate 18*f* and the lamp and reflector assembly in position on plate 18*e***, the whole being designed for easy removal and for accurate reassembly in unchanged relative positions. This affords assurance that the distribution pattern of the light (the variations in intensity at different parts of the beam's cross-section) will be substantially unchanged after the reflector has been removed for inspection.

Aperture **16*a* in aperture mask 16 is shown aligned with apertures 12*a* and 14*a* of the low-speed and high-speed discs, all three of these apertures being arranged in series relation to transmit a parallel-beam part 18′ of the light from source 18 to photocell 20*a* in the assembly 20 of photocells. The light reaching cell 20*a* is of uniform intensity over the exposed area of the photocell. To special advantage, the photocells are of a form that provides progressively increased response in proportion to the photocell area that is exposed to a uniform beam of light. A wafer of silicon formed as a photodiode is a known example of such a photocell. In FIG. 2, these wafer-type photodiodes are mechanically supported by and electrically connected to a metal plate 16′ at apertures identical in shape and distribution to those in mask 16; and indeed mask 16 could be omitted in favor of mask 16′**.

As shown in FIG. 2, photocell **20*a* has its own adjustably biased amplifier 20′ and is connected to an individual storage unit 42 and in turn to common binary code utilization unit 44 for all the photocells of assembly 20. Amplifiers 20′ are of adjustable gain and are adjustably biased, or a selected part of an adjustable graduated-density optical-wedge filter individual to each photocell may be used, so that storage unit 42 will respond by assuming a condition to represent "light" or "dark" when the light is more or less than half of the maximum passed by the aperture in mask 16′ corresponding to aperture 16*a* in the most favorable relationship of apertures 12*a* and 14*a*. Apertures 14*b* and 16*b*, and the corresponding aperture in mask 16′, are also serially arranged. These are disposed at an area not overlapped by low-speed disc 12, for selectively exciting photocell 20*b* and thus for providing additional code bits to unit 44 in the manner described in connection with photocell 20*a*. A common gating signal generator 46 controlled by photocell 20***c* (discussed further below) suppresses changes in condition of storage units 42 except when the high speed disc 14 is at or close to the center of the successive discrete positions to be encoded. Light-level monitoring photocell 20*d* and monitoring circuit 48 provides a common bias output to all amplifiers 20′ and the like to compensate for variations of light output of bulb 18*a*. In this way the amplifier 20′ provides a control output to unit 42 in dependence on whether more or less than half the normal full-open condition of aperture 16*a* is in effect.

The construction thus far described is adapted to provide different binary codes identifying successive positions of low-speed shaft 26 and code disc 12, where the successive positions are those limited by the discrete code positions of high-speed code disc 14 and the gear ratio between the discs. In the illustrated example, shafts 26 and 32 are coupled by gears 28 and 30 having a ratio of 16 to 1, and the gears 34 and 36 which couple shafts 32 and 38 have a ratio of 8:1. Thus the gear ratio between shaft 38 and shaft 26 is 128 to 1. In the illustrated example (FIGS. 6 and 7) code disc 12 seemingly has 128 discrete positions, and code disc 14 likewise has 256 discrete positions. Without going into detail at this point, it may be stated that the code capability is $2^{15}$ or 32,768 discrete positions of shaft 26. This number can be represented in a binary code having 15 bits.

It is conceivable for a 15-bit binary code to be represented in a single code disc having 15 concentric code rings. However, this would involve an extremely high order of precision, and it would involve very small sensing apertures or areas which, in turn, would necessitate high intensities of light (in the case of photoelectric sensing), etc. Also, it would require extreme precision in locating the sensing elements on a true radius.

All of the foregoing problems are obviated through the resort, here, to the described two code members operated by shafts geared together, a high-speed shaft and a low-speed shaft. One part of the code that represents the position of the low-speed shaft is carried by one code member, the remainder of the composite code being carried by the high-speed shaft.

The use of high-speed and low-speed code members geared together has been proposed heretofore. It involves certain definite advantages and has certain limitations and difficulties. The size of the individual bits representing discrete significant positions is greater where two code members are geared together than where a single code member is used, by a factor approximately equal to the gear ratio. Thus, a code bit of .050 inch along the scanning direction o fthe high-speed disc in the case of two code discs geared together with a ratio of 128:1 would require a code bit size of .050/128 or 0.0004 inch in case the code were formed on one disc of the same size. Not only is the size of the bit a limiting condition, in the case of the single-disc code, but concentricity is even more critical. Eccentricity of 0.0004 inch leads to an error of 0.0008 inch at the worst parts of shaft rottaion.

Use of a single code disc can be made slightly more practical by using a disc of larger diameter; but even a 5-times increase in diameter would only make a comparable increase in the significant bit size, from 0.0004 to 0.002 inch in this example. Further, each bit sensing position of all the bits in the code where the code is all on one disc usually requires the same order of sensing precision as the smallest bit size. This is because the change from "0" to "1" or the reverse occurs at the edge of that bit during the same extent of shaft rotation as is involved for the smallest-size code bit. Therefore, the smallest diameter track of code bits among the concentric tracks on the disc is a limiting factor of the one-disc code, based on this consideration.

Use of geared-together code discs or drums or bands in a manner to avoid the foregoing difficulties involves the solution of yet another problem. It may be envisioned that a high-speed code disc is just completing one rotation and, correspondingly, one sequence of code combinations and is to start another rotation, and that these two rotations are to be distinguished by a change of one bit in the portion of the code carried by the low-speed disc. This change in the effective bit of the low-speed disc is to take place during the advance of the high-speed disc from the last bit-position of its code sequence (in one rotation) to the first bit of the code sequence, which is the next-succeeding bit coming into effect during the next rotation. In a code having $2^{15}$ code combinations, this represents a one-bit change effectively in less than a $\frac{1}{30,000}$ part of a rotation of the low-speed disc.

The foregoing poses a problem of resolving what would otherwise be an ambiguity in the code of the low-speed disc and the high-speed disc combined, where failure of the sensing apparatus to recognize instantly the change from the end of one code-combination sequence of the high-speed disc to the start of the next code sequence could create a gross error. A second problem is one of time. The change is to take place abruptly. In an example, it may be considered that the low-speed shaft goes through one rotation in 10 seconds. In a code where there are 32,768 significant shaft positions for a complete rotation, the change that is to take effect at the end of one code sequence of the high-speed disc occupies a time interval of 10 secs./32,768 bits or about 0.0003 sec. As will now be explained, the required code change is made in one manner pursuant to an important feature of this invention, without ambiguity and without resort to abrupt mechanical movement of any parts.

FIGS. 3–8 inclusive illustrate a practical example of code discs 12 and 14 and the aperture mask 16 (16′), and the manner of their operation. Certain aspects of these codes are unique, and are discussed below. As seen in FIG. 8, aperture mask 16 (16′) includes two groups of code-pattern apertures including eight apertures 16*a* and seven apertures 16*b*. In addition, mask 16 includes a diamond-shaped gating aperture 16*c* and an additional monitoring aperture 16*d*. Nest 20 of photocells includes one photocell for each aperture in mask 16.

Figure 3:
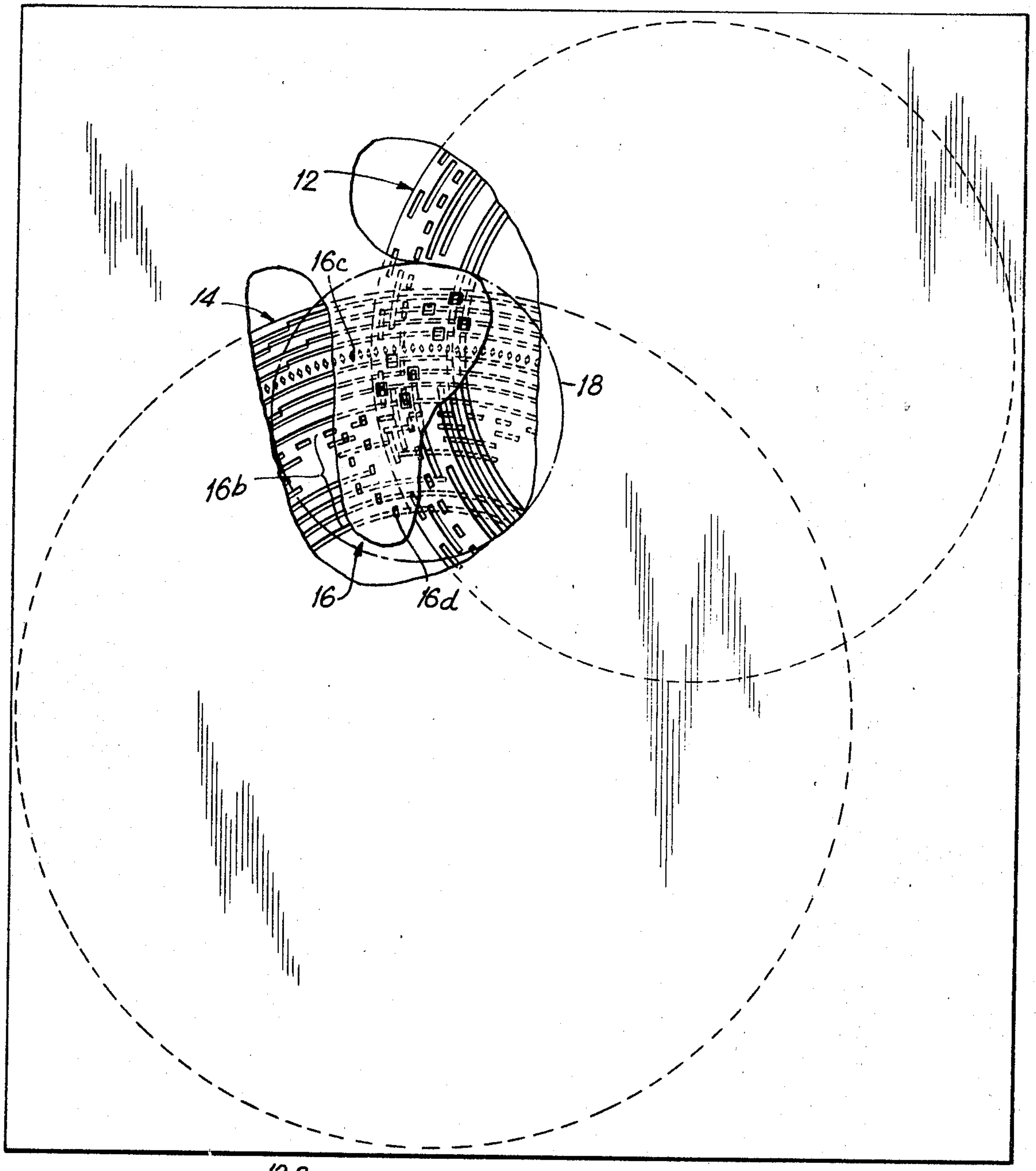
FIG. 3 is a plan view of the portion of the apparatus in FIG. 1 as viewed from the plane represented by line 3—3 therein, certain portions being broken away to reveal other parts and including in phantom lines the light source of FIGS. 1 and 2.

In FIGS. 3 and 6, the innermost aperture 14*d* of high-speed code disc 14 is a complete circle. This aperture provides a light-level monitoring means for monitoring photocell 20*d*. Various mechanical expedients are possible to maintain the parts of disc 14 in assembly despite the inclusion of complete-circle aperture 14*d*, and despite the inclusion of eight spiral apertures 14*a*. In the present example, the discs are of glass or other suitable transparent material. The apertures are transparent areas. The other areas of the discs bear an opaque lamination or coating, or the like. Other forms of code members will be found suitable, depending on the form of sensing elements used.

Seven circles or tracks 14*b*–1, 14*b*–2, etc. of code apertures provide seven bits contributed by the high-speed code disc toward the fifteen-bit code combination of the encoder.

Diamond-shaped apertures 14*c* perform a gating function, rendering all code-storage units 42 responsive to their photocell input circuits when disc 14 is nearing, at and leaving, each of the regularly spaced discrete positions for which there should be a distinctive code combination. This gating arrangement is of general application, and it is useful here; but as will be seen, a feature of this invention makes it possible to omit such gating arrangements while still achieving virtually all the operating benefit of such a gating provision.

There are eight spiral apertures 14*a*, designated 14*a*–1, 14*a*–2, etc., this series 1, 2, 3 . . . starting with the radially innermost spiral. Each spiral has a step or discontinuity at one point, the step being defined by the offset end portions of each one-turn spiral. The step 14*a*–1′ of spiral aperture 14*a*–1 is at a part of disc 14 diametrically opposite the steps of the other spiral apertures.

Aperture mask 16 (16′) has eight apertures 16*a*–1, 16*a*–2, etc., this numerical series starting with the mask aperture closest to the center of high-speed disc 14. These apertures are not distributed along a particular radius of disc 14, nor along a radius of disc 12, but are staggered to afford space for mounting the related photocells 20*a*, etc.

Low-speed disc 12 has eight circles of code-bit apertures designated 12*a*–1, 12*a*–2, etc., this numerical series progresses radially outward, starting with 12*a*–1 nearest the center of disc 12.

There is one aperture 16*a*–1, 16*a*–2, etc., for each of the eight code bits provided by the circles of code apertures in disc 12. These apertures are located in relation to the code bits of disc 12 and in relation to the steps of spiral apertures 14*a*–1, 14*a*–2, etc., so that at the "home" or zero position of the high-speed disc there is a smooth part of spiral 14*a*–1 opposite aperture 16*a*–1 and there is a series of steps 14*a*–2′, 14*a*–3′, etc. concurrently opposite the related apertures of mask 16; and at that time the areas of disc 12 representing the code contribution of the low-speed disc are opposite the mask apertures 16*a*. Step 14*a*–1′ moves into line with aperture 16*a*–1 one-half a revolution after steps 14*a*–2′, 14*a*–3′, etc., have left their respective mast apertures 16*a*.

The track elements or apertures and intervening opaque areas at different radii of disc 12 (with the exception of apertures 12–1 and 12–20) are successively of double the arcuate extent of the minimum-size apertures (see track 12–6) in that disc. The code apertures of disc 14 have the same "successively double" relationship.

Figures 4, 5:
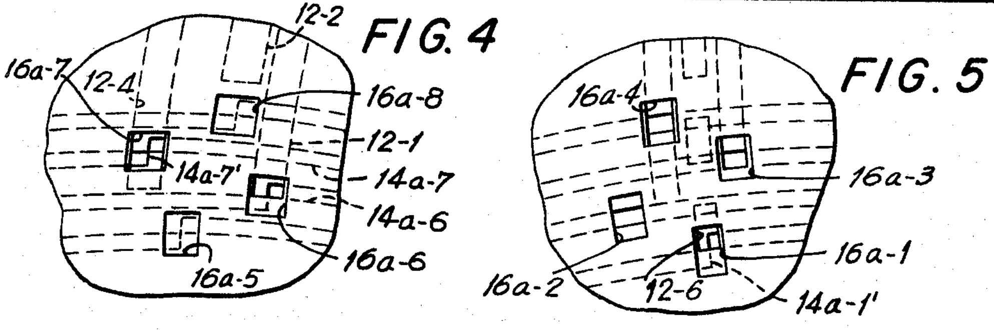
FIGS. 4 and 5 are greatly enlarged fragmentary views of portions of the parts in FIG. 3 in other relative positions than are illustrated in FIG. 3.

Apertures 12–6 are the smallest code apertures of disc 12. These are located so that either the leading half of an aperture 12–6 or the trailing half of such an aperture is opposite one-half of aperture 16*a*–1 when the spiral step 14*a*–1′ is about to pass—or has just passed—that aperture. This is illustrated in FIG. 5. Both discs may be considered to be rotating counterclockwise. Spiral-step 14*a*–1′ moves past aperture 16*a*–1 at a time when the leading half of an aperture 12–6 occupies the upper half of mask aperture 16*a*–3. More significantly, the leading edge of an aperture 12*a*–6 is aligned with the radially inner edge of one offset portion of the spiral and with the radially outer edge of the other offset portion of spiral 14*a*–1. Additionally, the line that defines the ends of the spiral is essentially parallel to the arcuate edges of the apertures in track 12–6. The drawing (FIG. 5) shows the leading part of spiral aperture 14*a*–1 entering the part of mask aperture 16*a*–3 opposite the area occupied by the leading half of aperture 12–6. As this happens, the trailing offset part of the same spiral aperture 14*a*–1 moves away from mask aperture 16*a*–3. Notably, the light beam that passes through apertures of discs 12 and 14 is limited by the edges of those apertures. Consequently, the edges of apertures 16*a*–1 . . . 16*a*–8 are not critical so long as those apertures are large enough.

The substitution of the leading end of spiral 14*a*–1 opposite mask aperture 16*a*–3 for the trailing end of this spiral changes the condition at this mask aperture from one in which opaque portions of discs 12 and 14 obstructed the mask aperture to a condition in which an offset part of the spiral aperture is serially aligned with the leading half of an aperture 12–6. During the continuing full rotation of disc 14, the apertures 12–6 advances until the trailing edge of this aperture reaches the middle of aperture 16*a*–3. During this same rotation, spiral 14*a*–1 maintained a constant exposure of one-half of an aperture of track 12–6 through the mask aperture.

At the start of the next-ensuing rotation of disc 14, the trailing end of the spiral leaves the trailing half of aperture 12–6 and is replaced by an opaque part of disc 14. The leading end of spiral 14*a*–1 that enters mask aperture 16*a*–3 confronts an opaque part of disc 12.

Thus there are alternate changes from open to closed and from closed to open at aperture 16*a*–1 in successive rotations of high-speed disc 14. These changes occur at one-half a high-speed rotation away from "zero," at 1½ rotations away from "zero," and repeatedly at the halfway point in each succeeding rotation of disc 14. Each such change that occurs is started and completed during the traverse of step 14*a*–1′ across aperture 16*a*–1. The width of the apertures in track 12–6 as measured along the related spiral aperture 14*a* (and of all the apertures of code disc 12) is made equal to a one-bit advance of the high-speed disc, as measured by the travel of the transverse line at the stepped end parts of the related spiral aperture 14*a*. Ideally, the widths of the spiral apertures are here related to the widths of the apertures in disc 12 so that the same aperture areas are exposed at all of the apertures 16*a*. Assuming uniform illumination of all apertures 16*a*, all of the related amplifiers 20′ can be alike.

The exposed areas of the photocells identified with apertures 14*b* are also made equal to each other and equal, too, to the exposured areas at mask apertures 16*a*. The paired edges of each aperture 16*b* extending across the corresponding tracks 14*b*–1, 14*b*–2, etc. are separated by a distance equal to a one-bit advance of the related track 14*b*, and hence apertures 14*b*–1, 14*b*–2, etc., differ significantly in width. The transverse dimension of the exposed area at each aperture 16*b* is limited by the radial extent or width of the apertures 14*b*–1, etc. of the high-speed disc. These track-aperture widths are proportioned to yield equal exposed areas at mask apertures 16*b* so that the light flux passed by each aperture is equal to that of the others. It is also made equal to the exposures afforded by discs 12 and 14 at apertures 16*a*. This is of advantage in that all the photocell circuits 20′ can be made to the same design and adjustment.

Each of the spiral apertures 14*a*–2, 14*a*–3, etc. functions in the same manner as spiral aperture 14*a*–1 in changing the sensed portion of the low-speed code disc abruptly, during only a one-position advance of the high-speed disc. This result is achieved without in any way resorting to abrupt mechanical motions of any parts. The sizes, shapes and locations of the mask apertures do not require close precision, nor is the location of any of the shafts critical.

The codes of discs 12 and 14 form a composite such that the eight binary orders of disc 12 and the seven binary orders of disc 14 yield a capacity of $2^{15}$ or 32,768 discrete coded positions for the shaft of disc 12. The codes illustrated are "cyclic" codes, wherein there is only one change—from light to dark or the reverse—in any of the fifteen bits or orders of the code in advancing from any discrete encoded position to the next.

It will be recalled that the photocells 20 have a response proportional to the area thereof exposed to light, and amplifiers 20′ are all designed so that a controlling change of output from "light" to "dark" and the reverse occurs when more or less than half of the area of the photocells is exposed at the standardized light intensity. The light intensity across each mask aperture is virtually uniform, and the effective intensities of light at all the apertures are equalized, as by adjustment of the amplifiers 20′. With such proportions, a bit change at any aperture 16*b* occurs as an edge of a track aperture crosses the center of such aperture. A like effect occurs at each aperture 16*a*. As mentioned above, one offset portion of any given spiral is substituted for the adjoining offset spiral position is a one-bit advance of high-speed disc 14*a*. Therefore, where the offset portions of a spiral cross an edge of an aperture in disc 12, a code-bit change of the low-speed disc occurs as the transverse line at the ends of the offset spiral portions crosses the midpoint of the width of an aperture in disc 12.

Each bit-change thus occurs during a one-bit advance of the high-speed disc whether the bit-change is produced by the code of the high-speed disc or the code of the low-speed disc. The change takes place at the midpoint of a one-bit advance of the high-speed disc, in either direction of rotation and in going from "light" to "dark" or from "dark" to "light." In practical circumstances, there may be an error, and the change may occur at a point displaced from center at any of the code-bit tracks but such an error is only part of a one-bit advance of the high-speed disc.

The code employed is a cyclic code which by definition involves a bit-change at only one track in going from any bit combination to the neighboring bit combination. This means that the fact of a bit change occurring at any one order of the 15 tracks of bits signifies a change of the coded position representation. With this effect available, it would be practical to omit the diamond gating apertures 14*c*, the corresponding photocell 20*c* and gating signal generator 46, an obvious simplification.

The foregoing apparatus involving an omission of the gating arrangement would create difficulties if multiple bit-changes are to be expected in going from one bit combination to the next, as is characteristic of bits occurring at slightly different times would produce serious and erratically different output codes as one bit change after another occurred in the process of going from one code combination to the next. In case a non-cyclic code is used in applying other features of the invention, the response level of the photocell circuits is changed so that bit changes take place in the respective sensing circuits earlier and are called into effect wholly by the effect of gating apertures 14*c* and the related circuit. In this way, the probable adverse consequence of multiple bit changes from one code combination to the next in non-cyclic codes is avoided.

It has been indicated that mechanical input is advantageously coupled at shaft 32. This shaft easily drives both the low-speed shaft 26 and the high-speed shaft 38 of the encoder. (Incidentally, the terms "low" and "high" are related to each other and in this sense these terms are relative, for even shaft 38 may operate at a speed that would be considered low for some purposes.) Shaft 32 would then be geared down (external of the structure illustrated) to the shaft or other movable member whose position is to be encoded. It is not intended that shaft 26 will operate through its maximum capacity, but only toward zero and toward its maximum limit, departing from some intermediate part of its range. For this reason it is sometimes important to be able to set the encoder at some known part of its range.

FIGS. 9 and 10 illustrate a mechanical means for setting the encoder at any one of a large number of known positions. Gears 26 and 34 have holes 26*a* and 34*a* of progressively different sizes. Holes 28*a*–11 and 34*a*–7 are smallest and are alike. Holes 28*a*–12 and 34*a*–8 are equal; and so on, to the largest holes 28*a*–15 and 34*a*–11 that are equal. These holes are located alike on their respective gears. Hole 28*a*–15 is displaced ½ of a rotation from hole 28*a*–14, ¼ of a rotation from hole 28*a*–13, ⅛ of a rotation from hole 28*a*–11. These holes are thus spaced from hole 28*a*–15 by $\frac{1}{2}n$ where *n* is the numerical series 1, 2, 3, 4. Holes 34*a*–10, 34*a*–9, 34*a*–8 and 34*a*–7 are correspondingly spaced from hole 34*a*–11.

A short tube 10*b* projecting from frame plate 10*a* is aligned with the centers of holes 28*a*–11 through 28*a*–15 and with the centers of holes 34*a*–7 through 34*a*–11. A tool or gage rod 50 has one end 50*a* having a succession of steps formed by axially aligned portions whose diameters correspond to the sizes of the holes in gears 28 and 34. In case tool 50 enters holes 34*a*–11 and 28*a*–15, it will penetrate to its maximum extent and that represents "0" in the positioning of the code discs in relation to the sensing-element assembly 20. In case tool 50 penetrates hole 34*a*–11 and hole 28*a*–14, then the mid-point of the code range has been set. In this case, tool 50 does not penetrate all the way. It is arrested so that one of its series of gage marks 50*b* representing the midpoint of its range is aligned with the external face of the tube 10*b* which forms a gage-receiving passage in plate 10. For a total number of code positions of $2^{15}$ binary combinations, the half-range position may be identified $2^{14}$. Other positions of the code discs in which tool 50 penetrates gear 34 and goes on to enter gear 28 are represented by gage marks 50*b* which line up with the outside surface of gage-rod tube 10*b* at corresponding parts of the code range. If it were desired, an additional hole 28*a*–13 could be added at a position diametrically opposite the hole shown, and further holes 28*a*–12 could be included at the quadrants of gear 28, etc. if that should appear desirable.

Gear 34 can be quickly set at its "0" position and at other positions representing significant positions in the code range, by lining up hole 34*a*–11 with any of the holes in gear 28, and then (if desired) advancing gear 34 to various known parts of the code range as the holes in gear 34 move into line with tube 10*b*. Thus, it may be assumed that tool 50 has penetrated both gears, the reading at scale 50*b* is noted, and the tool is withdrawn. Gear 34 is indexed to advance hole 34*a*–7 (for example) into line with tube 10*b*. Tool 50 will then be advanced only until its smallest end portion enters that hole, and the reading "$2^7$" will be noted in the scale markings 50*b*. (The next-larger portion of tool 50 is too large to enter hole 34*a*–7.) This signifies displacement of the code discs from the previous setting (where one of the holes 28*a* was aligned with tube 10*b*) by $2^7$ sequential coded positions or code combination.

The two series of holes 28*a* and 34*a* and the cooperating gage 50 provide a mechanical means for learning the part of the code range that is in effect when the external apparatus coupled to shaft is in a given part of its range. This is a mechanical aid in setting up initially, without having to resort to the sensed code readout and the interpretation of that read-out. Pins 28*b* and 34*b* on gears 28 and 34 are at standardized positions so that they have a predetermined alignment (viewed in the direction of the large arrow in FIG. 9, for example) when holes 34*a*–11 and 28*a*–15 are aligned with tube 10*b*. This occurs when code discs 12 and 14 are at "0," assuming that the code discs and the various gears and properly oriented with their respective shafts (as by keys and slots) and gears 34 and 36 are properly related by similar index markers.

The large code capacity of the apparatus described can be utilized fully only where the gearing between the high-speed code disc 14 and the external apparatus is substantially free of backlash. The small amount of backlash that is tolerable in the whole gear train from high-speed shaft 38 to the external unit whose position is to be encoded can readily be calculated. It must be only a fraction of the discrete angle through which the high-speed code dics 14 rotates in advancing from one coded position to the next. Ordinary gearing of such limited backlash is costly to the point of being impractical. The backlash might be taken up by a pair of gears on a common shaft with spring bias urging teeth of the two gears to spread apart in the mating spaces between teeth of the meshed gear. However, this would be effective only at one part of a gear train, and it would introduce excessive friction and would result in extra mechanical loading on the gear train and extra wear.

In the present encoder, realization of the full position-encoding capacity is assured by a motor 52 whose rotor on shaft 38 reacts with its stator on frame plate 10*a* to apply torque to shaft 38. Torque-applying unit 52 is a motor such as a small fractional-horsepower induction motor. In this apparatus it is stalled when the encoder is at rest, and it operates forward or it is driven in reverse, wholly in dependence on the motions and primary drive of the unit whose position is to be encoded. It maintains an induced bearing pressure at the clockwise faces of the teeth of gear 36 (for example) or at their counterclockwise faces, but not both. In one direction the motor drives the high-speed code disc, but to an extent limited by the mechanical input at shaft 32. In the opposite direction, the externally applied mechanical effort drives the code disc and the external effort overpowers motor 52 and drives it in reverse.

In the foregoing example, there is no need to absorb the small amount of backlash that must exist in some small measure where gear 30 meshes with gear 28. This backlash does not disturb the effectiveness of the apparatus. Mesh point 28–30 is not part of the drive train between code-disc shaft 38 and the external device whose position is to be encoded. Motor 52 eliminates backlash in that drive train.

Some further discussion of the codes used on discs 12 and 14 may be helpful. The codes shown in FIGS. 6 and 7 are "cyclic," in that there is a change from light to dark or the reverse at only one of the fifteen bit-sensing apertures **16*a* and 16*b*, when going from any one code position to its neighbor, in either direction. It is easy to recognize the application of this principle or criterion in relation to most of the binary orders or sensing points, as at each of the seven bit-sensing points 16*b*. It may also be accepted tacitly that only one bit at a time changes at sensing apertures 16*a* by the combined effects of the spiral gating apertures 14*a* and the code apertures of disc 12. One such change is illustrated in FIG. 4. In this figure, the spiral apertures 14*a* shown are in a position 180° away from the position represented in FIG. 5. (FIG. 5 illustrates the operation of spiral 14*a*–1, described above.) In aperture 16*a*–7, spiral 14*a*–7 has both of its offset end portions available to pass light through the long aperture of circular track 12–4. A constant area of exposure of the related photocell is maintained throughout the travel of spiral step 14*a*–7′ across the aperture of track 12–4, so there is constant input to the related amplifier 20′. Consequently no bit change occurs on the illustrated pass of spiral step 14*a*–7′** past the mask aperture.

There is no aperture of code disc 12 opposite mask aperture **16*a*–5 in the illustrated position of disc 12 (FIG. 4), so there is no change of this bit of the code combination during this one-bit advance of disc 14. The same is true at mask aperture 16*a*–8**.

One extremity of a code aperture 12–1 is at the midpoint of apertures **16*a*–6 in FIG. 4, and so a bit change occurs here when one end portion of spiral step 14*a*–6′** is replaced by the other.

It is noteworthy that the bit-changes effected by spirals **14*a*–2 through 14*a*–8 occur generally at a time in the rotation of code disc 14 when a particular set of code apertures 14*b* of that disc are being sensed at mask apertures 16*b*. In contrast, the spiral step 14*a*–1′ (FIG. 5) performs its function at a part of the code pattern 14*b* of code disc 14 that is diametrically opposite to the part in effect for steps 14*a*–2′ through 14*a*–8′ as already described. This particular detail has proved particular useful in solving the problem of achieving a cyclic code through combined use of two binary code discs. Notably here, one bit change in the group of code bits of disc 12 occurs half-a-revolution of disc 14 before a change of another bit (by another spiral) in the group of bits of disc 12**. Cyclic codes using two discs and operated at a large ratio (128:1 in the present encoder) are possible without this feature. However, the code patterns and the location of the spiral-aperture steps as described, avoids other more cumbersome devices for achieving a dual-geared-disc binary code.

It will be recalled that there are 64 apertures in the circular series 12–6. This would suggest a maximum capability of disc 12 equal to 128 bit changes in the code per revolution of disc 12. However, the described composite code includes 256 bit changes produced by disc 12 which includes eight code-aperture circles which cooperate with eight gating spirals on disc 14. This is understandable because a change occurs in the code bits contributed by disc 12 once in each half-revolution of disc 12. The described arrangement has the effect of doubling the information capacity of disc 12 from an apparent total of 128 code combinations to an actual total of 256 code combinations. For each of these 256 code combinations, disc 14 with its seven circular tracks of code apertures contributes 128 combinations for each of the 256 changes provided by disc 12, and a total capacity of 32,768 code combinations in the encoder.

The code patterns of discs 12 and 14 (which are geared together with a ratio of 128:1) and the aperture pattern of mask 16 as shown in FIGS. 6, 7 and 8, are actual photocopies of a working shaft-position encoder. In almost all instances, the track elements in each track are half the arcuate extent of track elements in the track of the next-higher order of the code. An exception is found in that the aperture of track 12–2 is 180° in extent, and this equals the 180° aperture of track 12–1. This is a normal detail of a "reflected" binary code.

The present invention involves several features that achieve distinctive results in a new and highly successful manner. However, the illustrative embodiment is susceptible of a wide range of modification and varied application. Consequently, the invention should be construed broadly in accordance with its full spirit and scope.

What is claimed is:

1. A position encoder including a low-speed code member and a high-speed code member each having plural tracks of bits presented in respective sensing positions, said high-speed code member having a code that repeats in cycles, a fixed-ratio drive means coupling said code members together so that the codes thereof constitute a sequence of composite codes representing the successive positions of a device coupled to the encoder, and gating means for controlling sensing of plural tracks of the low-speed code member including gating masks operable coordinately with the high-speed code member, said low-speed code member being arranged so that plural tracks thereof simultaneously present in sensing position a pair of code bits, and the corresponding gating masks each having stepwise offset portions operated along respective paths transverse to the plural code-bit tracks of the low-speed code member at sensing position for abruptly changing from one bit to the other of each pair of bits of the low-speed member in sensing position.

2. A position encoder, including a low-speed code member and a high-speed code member, each of said members bearing plural tracks of code bits, means for sensing said code members including a pattern of sensing elements corresponding to said plural tracks, a fixed-ratio drive means coupling said high-speed code member to said low-speed code member and including drive coupling means for a device whose positions are to be encoded, the codes of said high-speed code member being repeated in cycles during the slow changes of code of the low-speed code member, said sensing elements corresponding to the tracks of the low-speed code member being disposed to sense a two-bit part of the respective tracks, and masking means including a gating mask for each sensed track of said low-speed code member, said masking means being operable in cycles in time with said high-speed code member, each said gating mask having a stepwise related pair of off-set portions operable transverse to a respective low-speed track for abruptly changing the sensing exposure from one to another of a pair of code bits of the low-speed code member in sensing position.

3. A position encoder in accordance with claim 2, wherein said cyclically operable gating masks are in the form of spirals whose ends are said step-wise off-set portions as aforesaid.

4. A position encoder in accordance with claim 2, wherein a plurality of said gating masks are disposed relative to each other so that said off-set portions pass their respective sensing elements simultaneously.

5. A position encoder in accordance with claim 2, wherein the codes of said code members are a cyclic code, and wherein the stepwise related off-set portions of one of said gating masks traverses the corresponding sensing element at one time and wherein the stepwise off-wet portions of the others of said gating masks traverse their respective sensing elements at another time.

6. A position encoder in accordance with claim 2, wherein each said gating mask is in the form of a spiral whose width substantially equals the extent of a bit of the corresponding low-speed track and wherein the ends of the spiral constitute the aforesaid stepwise related off-set portions.

7. A position encoder in accordance with claim 5, wherein each said gating mask is in the form of a spiral whose width substantially equals the extent of a bit of the corresponding low-speed track and wherein the ends of the spiral constitute the aforesaid stepwise related off-set portions.

8. A position encoder, including a low-speed code member and a high-speed rotary code member, each of said members having plural tracks of binary code bits which together constitute a composite code sequence, said tracks of bits being formed of track elements each comprising one or more bits and the track elements being at least generally of different extent from each track to the others and including for the low-speed code member one track having smallest-size track elements, a train of gears coupling said code members together wherein the gear ratio causes the low-speed code member to advance through the extent of one of said smallest-size track elements while the high-speed rotary code member advances through its complete code sequence, said gears including a gear-reduction coupling from said high-speed code member to an external device whose position is to be encoded, sensing means for said code members including a sensing element for sensing each of said tracks, the sensing elements for the tracks of said low-speed code member being arranged to sense a sufficient extent of each respective track to sense two bits thereof when brought into sensing position, masking means for selecting one bit of each low-speed track being sensed, said masking means being in the form of a plurality of spiral masks carried by the high-speed rotary code member, the spiral masks being disposed to traverse corresponding tracks of the low-speed code member at the sensing elements, each portion of each spiral mask at sensing position being arranged to remain aligned with one bit of the low-speed code member during the operation of the latter, the ends of each spiral mask being mutually offset stepwise so as to change sensing abruptly from one bit to the next of the low-speed code member during certain one-bit advances of the high-speed rotary code member.

9. A position encoder in accordance with claim 8, wherein said composite code is a cyclic code, wherein one of said spiral masks cooperates at the corresponding sensing element with the smallest-size track elements of the low-speed code member, and wherein the stepwise offset portions of all the other spiral masks are disposed on the high-speed code member relative to each other and to said one spiral mask to reach their sensing positions after 180° rotation of the high-speed code member following disposition of the offset portions of said one spiral mask at sensing position.

10. A position encoder in accordance with claim 8, further including a unidirectional rotary motor coupled to said high-speed rotary code member and, only through the aforesaid gear-reduction coupling, to the external device whose position is to be encoded, for insuring unique and repeated consistency of the codes represented by the encoder and the positions assumed by the external device.

11. A position encoder including a low-speed code member and a high-speed rotary code member, each of said members having plural tracks of binary code bits which together constitute a composite code sequence, a train of gears coupling said code members together wherein the gear ratio causes the low-speed code member to advance through a certain extent while the high-speed rotary code member advances through one complete rotation, said encoder including means for coupling said high-speed code member to an external device whose position is to be encoded, sensing means for said code members including a sensing element for sensing each of said tracks, a unidirectional rotary motor coupled to said high-speed rotary code member and, only through the aforesaid coupling means, to the external device whose position is to be encoded, for insuring unique and repeated consistency of the codes represented by the encoder and the positions assumed by the external device.

12. A position encoder, including a group of sensing elements, encoding means for disposing successive groups of code-representing formations at said sensing elements, and mechanical means for indicating when at least certain of said groups of formations are at said sensing elements, said mechanical indicating means including a rotary member coupled to and operable coordinately with said encoding means and having a circular sequence of apertures formed therein including a first aperture and additional apertures spaced therefrom by $\frac{1}{2}n$ parts of 360° where $n$ is an integer of the successive numerical series 1, 2 . . ., said apertures being of sizes differing from said first aperture progressively in correspondence with said integers, means defining a gage-receiving passage in alignment with a point along said circular sequence of apertures, and a gage rod having a succession of portions of progressively smaller sizes corresponding to the sizes of said apertures and said gage rod having a succession of index marks corresponding respectively to the sizes of said portions of the gage rod, said index marks cooperating with said passage-defining means to indicate which of said apertures has received said rod.

13. A position encoder in accordance with claim 12 including a further rotary member having at least a portion thereof interposed between said gage-passage-defining means and said first rotary member, and gear means coupling said further rotary member to said first-mentioned rotary member for 2N rotations of said further rotary member for each rotation of the first-mentioned member, N being the highest value of $n$, and said further rotary member having a further circular sequence of apertures disposed for alignment successively with said passage-defining means, said further sequence of apertures including a first aperture of largest size and additional apertures spaced apart on said further rotary member by $\frac{1}{2}n'$ where $n'$ is an integer of the continuous numerical series 1, 2 . . ., the last-mentioned additional apertures being progressively smaller than said largest size aperture, said largest-size aperture and said further apertures corresponding in size to said progressively smaller portions of said gage rod, and said gage rod having a further series of gage marks cooperable with said passage-defining means to indicate which of said apertures of said further rotary member has received the corresponding portion of said gage rod.

14. In an encoder, a code member having a succession of uniform bits forming a track of bits defined by alternate opaque areas and apertures, a light source for directing a beam of light of uniform intensity toward an area of said code member in a sensing position, the beam being arranged to illuminate two adjacent bits in said sensing position, a light-sensing element having a sensitive area confronting the two bits in sensing position, said sensing element being of a type whose response is substantially proportional to the illuminated area for a given intensity of incident light, and gating mask opposite said code member for selectively blocking one of the two bits of said code member in said sensing position, said gating mask being movable across said track and having stepwise related aperture portions each of which is adapted to expose one of said bits and the transition between the aperture portions being movable across the track of bits, the transition being formed to expose a constant area of the track in all positions of the traverse of said transition across the sensing position.

15. An encoder in accordance with claim 14, further including a second rotary code member geared to said code member for higher-speed rotation, code combination sensing means for said second code member, and means coupling said second code member and said gating mask for coordinate operation related to operate the transition of the gating mask across the related track of bits during a one-bit advance of said second code member.

16. In combination, a code-bearing member having plural tracks each formed of a succession of bits, and means for exposing successive combination codes, each combination code including one and only one bit of each of said tracks, said exposing means providing a pattern of stationary apertures opposite said tracks, respectively, adapted to expose two bits of each respective track, means for limiting the exposure of said tracks through the pattern of apertures to one bit per track, and means for operating said code-bearing member and said exposure limiting means in timed relationship for exposing successive combination codes, said exposure limiting means having plural masks including for each track a mask having first and second elongated aperture portions for exposing only one bit of its related track, said elongated aperture portions being operable lengthwise along a path transverse to the related track of code bits, said first and second aperture portions of each mask being mutually off-set longitudinally and laterally relative to said operable path thereof and constituting a step formation.

17. A combination in accordance with claim 16, wherein said plural tracks of said code-bearing member are arranged relative to said pattern of stationary apertures to bring successive pairs of mutually adjacent bits of each of said plural tracks simultaneously into position for exposure by said pattern of apertures and wherein said step formations are related to the code-bearing member and to each other to traverse simultaneously said stationary apertures while said pairs of bits are at said apertures.

18. A combination in accordance with claim 17, wherein said code-bearing member includes a further track of code bits additional to said plural tracks and wherein said pattern of stationary apertures includes a related stationary aperture and wherein said exposure limiting means includes a further mask additional to and movable with said plural masks, said further mask having a step formation as aforesaid, the step formation of said further mask being operated relative to the code-bearing member for traversing two mutually adjacent bits of said further track at said related stationary aperture at a time other than the aforesaid simultaneous traverse of the step formations of said plural masks past said stationary apertures.

19. In combination, a code-bearing member having plural tracks each formed of a succession of bits, sensing means including a pattern of sensing devices opposite said tracks, each said sensing device being disposed in sensing relation to a sufficient extent of its respective track to sense two bits thereof, means for limiting the sensing by the sensing means to one bit of each of said tracks when two bits are in sensing position, and means for operating said code-bearing member and said limiting means in timed relationship for effecting the sensing of successive combination codes of bits including one bit of each of said tracks, said limiting means comprising plural masks, including for each track a mask having sensing-exposure portions operable along a path transverse to the respective track, each of said sensing-exposure portions being of a width to limit sensing of the related track to one bit, said portions being off-set laterally and longitudinally relative to said operable path thereof and constituting a step formation.

20. A combination in accordance with claim 19, wherein the bits of said plural tracks of said code-bearing member are arranged to be brought in pairs into sensing position simultaneously, and wherein the step formations of said limiting means are related to the code-bearing member and to each other to traverse simultaneously the aforesaid pairs of bits in sensing position.

21. A combination in accordance with claim 20, including an additional sensing device and wherein said code-bearing member further includes a track of code bits additional to said plural tracks, the bits of said additional track being arranged to be brought in pairs into sensing relation to said additional sensing device at a time other than the simultaneous disposition of pairs of bits of said plural tracks in sensing position as aforesaid, and wherein said limiting means includes a further mask additional to said plural masks and movable therewith and having a step formation as aforesaid arranged to traverse said additional sensing device while a pair of bits of said additional track are in sensing position.

22. In combination, a code-bearing member having plural tracks of bits arranged to represent successive code combinations at a pattern of sensing positions, operating means for advancing said tracks of bits continuously past said sensing positions, means at each of said positions for sensing a sufficient extent of each said track to sense two bits of the related track of bits during the advance of said code-bearing member, gating means having plural spiral gating masks including a spiral gating mask for each of said plural tracks, each said spiral gating mask having first and second end portions off-set relative to each other and constituting a step formation, and operating means for advancing said spiral gating means transversely opposite said tracks in time with the advance of said bits so that each step formation crosses the sensing position each time two successive bits of the related track reach sensing position, each said spiral gating mask being arranged to afford continuous sensing of one bit by its respective sensing means from the time said first end portion is opposite a given bit of its respective track and until said second end portion is opposite said given bit, further advance of said gating means carrying said first end portion of each said spiral gating mask opposite to a succeeding bit for sensing exposure thereof and carrying said second end portion away from said given bit which is thus obscured from the corresponding sensing means.

23. A combination in accordance with claim 22, wherein all but one of said spiral masks are related to each other so that the step formations thereof traverse the sensing elements simultaneously and wherein the corresponding plurality of said tracks are related to each other so that pairs of bits thereof are disposed opposite said sensing elements when the aforesaid step formations traverse the sensing elements, the step formation of said one of said spiral masks being disposed relative to the step formations of the others to traverse the corresponding sensing element at a time other than the aforesaid simultaneous traverse, and the track of bits corresponding to said one spiral mask being disposed relative to the other tracks of bits so that pairs of bits thereof are disposed opposite said corresponding sensing element when the corresponding step formation traverses the sensing element.

24. Apparatus for displaying combination codes for sensing, including in combination, a code-bearing member having plural tracks each formed of a succession of bits;

means providing a stationary pattern of apertures for exposing portions of said tracks including bits in each of the tracks representing combination codes;

means for controlling selectively the exposure of portions of said tracks opposite said pattern of apertures; and means for operating said code-bearing member and said controlling means in timed relationship;

said controlling means having plural masks including for each track a mask having first and second aperture portions operable cyclically along a path transverse to the related track of code bits, each of said first and second aperture portions being not greater than one bit wide as measured along the related track and said first and second aperture portions of each mask being mutually off-set longitudinally and laterally relative to said operable path thereof, said first and second aperture portions of each mask being interconnected to form at least approximately a spiral.

25. In combination, a first code-bearing member operable at relatively low speed and having plural tracks each formed of a succession of code bits, first sensing means including a pattern of photosensitive sensing devices in sensing positions opposite said tracks, each said sensing device being disposed in sensing relation to a sufficient extent of its related track to sense two bits thereof when such two bits are brought into sensing position, means for controlling the sessing of one bit of said two bits in sensing position, a cyclically operable second code-bearing member having plural tracks of code bits operable at relatively high speed coupled to said controlling means for operation coordinately therewith and second photosensitive sensing means for said second multiple-track code member for providing code output forming composite codes with the code output of said first sensing means, and means for operating said first and second code-bearing members and said controlling means continuously in timed relationship, said controlling means including plural optical gating portions operable transverse to said tracks of said first code-bearing member, respectively, and effective to shift the sensing operation of said first sensing devices, respectively, from one to the other of the related two bits when in sensing position, the advance of said optical gating portions across said two bits of each of the tracks of the low-speed code member occurring during a one-bit advance of the high speed code member.

26. A position encoder including a low-speed code member and a high-speed code member each having plural tracks of bits presented in respective sensing positions, a pattern of photosensitive sensing elements for said tracks, respectively, in said sensing positions, said high-speed code member having a code that repeats in cycles, a fixed-ratio drive means for said code members so that the codes thereof constitute a sequence of composite codes representing the successive positions of a device coupled to the encoder, said low-speed code member being arranged so that a pair of code bits of each of plural tracks thereof are periodically brought into sensing position simultaneously, and optical gating means operable coordinately with the high-speed code member for controlling the sensing of plural tracks of the low-speed code member and for abruptly changing from one bit to the other of each said pair of bits of each of said tracks of the low-speed member when in sensing position, said gating means including for each track of the low-speed member a pair of gating portions offset from each other laterally in relation to the path of operation thereof .

27. The combination in accordance with claim 24, wherein two bits of each track are at times at least partially exposed concurrently by said pattern of apertures and said two bits are next-adjacent to each other, and said aperture portions are laterally off-set relative to each other at least approximately one bit as measured along the related track.

28. The combination in accordance with claim 24, said first aperture portions related to said tracks being disposed to pass said pattern of apertures concurrently and said second aperture portions being disposed to pass said pattern of apertures concurrently, immediately before or after said first aperture portions.

29. The combination in accordance with claim 28, including an additional track of bits, and wherein said exposure controlling means has an additional mask having first and second mutually off-set aperture portions disposed to pass a related aperture of said pattern of apertures not concurrently with said first aperture portions and said second aperture portions.

30. In combination, a first code-bearing member operable at relatively low speed and having plural tracks each formed of a succession of code bits, first sensing means including a pattern of photosensitive sensing devices in sensing positions opposite said tracks, each said sensing device being diposed in sensing relation to a sufficient extent of its related track to sense two bits thereof when such two bits are brought into sensing position, a disc bearing plural concentric tracks of code bits and bearing plural essentially concentric spiral apertures disposed in relation to the tracks of the low-speed code member so that each said spiral aperture crosses a related track thereof at a sensing position, the respective widths of the spiral apertures being limited to no more than one bit of a related track of said low-speed code-bearing member and each spiral having end portions forming a step-like transition and being mutually off-set to be aligned with successive bits of the related track of the low-speed code member, photo-sensitive sensing means for said plural tracks of code bits of said disc, and means for rotating said disc and for advancing said first code-bearing member at relative spees for causing said transitions to cross their respective tracks during a one-bit advance of the later.

31. The combination in accordance with claim 30 wherein said transitions cross their respective tracks concurrently.

32. The combination in accordance with claim 30 wherein all but one of said transitions cross their respective tracks at one time and said one transition crosses its related track at a half-rotation of the disc before or after said one time.

33. The combination in accordance with claim 30 wherein said transitions effectively cause a one-bit advance of the sensing of said low-speed member within a one-bit advance of the disc.

34. A shaft position encoder including sensing devices, excitation means for said sensing devices, a code member having plural tracks of code bits operable relative to the sensing devices and adapted to control the exposure of said sensing devices to said excitation means, and gating means interposed in the path of the excitation from the excitation means to the sensing devices for controlling the exposure of each of said sensing devices to said excitation means, said gating means being operable across the sensed portions of said tracks and including respective portions for each of said tracks effective to change the sensing of each said track from one code bit to another abruptly, much faster than a one-bit advance of said tracks relative to said sensing devices.

35. A shaft position encoder in accordance with claim 34, including an additional cyclically operable code member having plural tracks of code bits, sensing means for the tracks of said additional code member, and said encoder including excitation means for said sensing means, drive means coupling the first-mentioned code member to said additional code member so that the latter advances past its sensing means through a cycle of code bits during a one-bit advance of the former past said sensing devices, said gating means being operable at a speed coordinated with said additional code member so that said abrupt change of sensing occurs during a one-bit advance of the additional code member relative to the sensing means thereof.

References Cited

UNITED STATES PATENTS

| | | | |
|---|---|---|---|
| 1,602,121 | 10/1926 | Ramsey | 178—7.6 |
| 1,810,610 | 6/1931 | Jones | 178—7.6 |
| 3,064,887 | 11/1962 | Waters et al. | 235—61.115 |
| 3,323,120 | 5/1967 | Vehlin et al. | |

MAYNARD R. WILBUR, Primary Examiner

J. GRASSMAN, Assistant Examiner

U.S. Cl. X.R.

250—231